(12) United States Patent
Yamamoto

(10) Patent No.: US 7,167,239 B2
(45) Date of Patent: Jan. 23, 2007

(54) SPECTROSCOPE AND MEASURING APPARATUS USING THE SAME

(75) Inventor: Takeshi Yamamoto, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 68 days.

(21) Appl. No.: 11/042,447

(22) Filed: Jan. 25, 2005

(65) Prior Publication Data

US 2005/0162650 A1 Jul. 28, 2005

(30) Foreign Application Priority Data

Jan. 26, 2004 (JP) ............................. 2004-016889

(51) Int. Cl.
*G01J 3/28* (2006.01)
(52) U.S. Cl. ..................... 356/326; 356/328; 356/329
(58) Field of Classification Search ................ 356/313, 356/325, 326, 328–334, 433, 437
See application file for complete search history.

(56) References Cited

U.S. PATENT DOCUMENTS 4,804,266 A * 2/1989 Barshad ..................... 356/308
5,880,833 A * 3/1999 Iwasaki ...................... 356/328
6,795,180 B1 * 9/2004 Bungo ........................ 356/319

OTHER PUBLICATIONS

J. H. Underwood et al.; "Beamline for Measurement and Characterization of Multilayer Optics for EUV Lithography"; *Proceedings of SPIE*; vol. 3331; pp. 52-61; (1998).

* cited by examiner

Primary Examiner—Renee Luebke
Assistant Examiner—Jessica L. McMillan
(74) Attorney, Agent, or Firm—Morgan & Finnegan, LLP

(57) ABSTRACT

Disclosed is a spectroscope and a measuring apparatus using the same. The spectroscope according to an aspect of the present invention includes a light source, a spectroscopic member for dispersing light from the light source in accordance with wavelength, a slit member arranged so that a portion of the dispersed light from the spectroscopic member can pass therethrough and a remaining portion of the light is blocked thereby, and a sensor having a spatial resolution capable of discriminating the wavelength of light passing through the slit member on the basis of a spectral distribution being projected in a spectral direction of light by the spectroscopic member. With this arrangement, the wavelength of light passing through the slit member can be discriminate real time.

5 Claims, 14 Drawing Sheets

SPECTROSCOPE AND MEASURING APPARATUS USING THE SAME

FIELD OF THE INVENTION AND RELATED ART

This invention relates to a spectroscope and a measuring apparatus using the same. More particularly, the invention is suitably applicable to measurement of reflectance or transmittance of an optical element by use of light of a predetermined wavelength.

The reflectance or transmittance of an optical element such as mirror or lens is measured by use of monochromatic light obtained from a spectroscope, and the characteristic of the optical element is analyzed on the basis of it (e.g., "Beamline for measurement and characterization of multiplayeroptics for EUV lithography", J. H. Underwood & E. M. Gullikson, 52/SPIE Vol. 3331).

In a measuring apparatus having a spectroscope to be used for analysis of optical elements or the like, light from a light source is resolved and light of a particular wavelength is extracted and is projected to an optical element, and reflected light or transmitted light from the optical element or, alternatively, secondary electrons produced therefrom, is measured. Examples are fluorescent X-ray analysis, Auger electron analysis, photoelectron spectrometric analysis wherein X-rays are projected on s sample surface in a vacuum and the spectrum of emitted photoelectrons is measured, and XAFS (spectral fine structure) analysis based on X-ray absorption spectroscopy (XAS). Furthermore, characteristics of an optical element such as reflectance of a reflection mirror may be measured by it.

Such measuring apparatuses may include a light source such as synchrotron radiation light source, laser excitation plasma light source, or discharge plasma light source, for example. The spectroscope may be a diffraction grating spectroscope or a crystal spectrometer.

In conventional spectroscopes, the angle of a diffraction grating or spectral crystal, for example, with respect to incident light is changed to vary the incidence angle of incident light, thereby to change the wavelength of light to be emitted through a predetermined exit slit. Also, the wavelength of emitted light is changed by changing the position of the exit slit with respect to the spectroscopic means.

On the other hand, the wavelength of light to be emitted through an exit slit of a spectroscope is determined by the set angle of a diffraction grating, the groove spacing of the diffraction grating, positions of an entrance slit and an exit slit, and so on. Since the parameters that determine the wavelength of light to be emitted from the exit slit of the spectroscope include a certain error, it is necessary check whether the light emitted from the exit slit actually has a desired wavelength.

To this end, conventionally the wavelength of emitted light is measured by use of a gas cell. The gas cell is a sealed container having a thin film window transmissive to light and being filled with a gas of a predetermined pressure. On the basis of an absorption spectral structure inherent to the gas contained in the gas cell, the wavelength of light emitted from the spectroscope is determined. The type of gas to be used has to be chosen in accordance with the wavelength of light to be calibrated, and in the wavelength region of 13–14 nm, generally a krypton gas is selected as a gas having an absorption spectrum in that wavelength region. When attenuation of incident light due to absorption by the gas cell is to be measured, the intensity of a beam passed through the gas cell is measured by using a detector. On the other hand, the beam intensity without the gas cell is measured, and the transmittance of the gas cell is detected on the basis of the intensity ratio.

FIG. 2 is a schematic view of an example of conventional spectroscope. Referring to this drawing, a conventional wavelength measuring method will be explained. In FIG. 2, light emitted from a light source 1 passes through an entrance slit 3 and it is collected by an optical element 4 such as a condensing concave mirror, for example. The light as reflected by this optical element 4 is now light 5 that has an inherent spectrum determined on the basis of the characteristics of the light source 1 and the optical element 4.

The light 5 is set to appropriate wavelength resolution by the entrance slit 6, and it enters a diffraction grating 8 (spectroscopic means). The diffraction grating 8 can be driven by a driving mechanism 9 for changing the rotational angle thereof. In accordance with the state of rotation of the diffraction grating 8, the range of wavelength to be emitted through an exit slit 14 is determined, and only light 27 having a particular wavelength can be extracted through the exit slit 14.

The light emitted through the exit slit 14 is projected on an optical sensor 23, and the intensity of the light can be measured thereby. For correction of a change in intensity of the light source, the light source intensity can be measured by an optical sensor 2 and, by dividing the sensor 23 intensity by the sensor 2 intensity, the intensity ratio (I/I0) can be calculated.

As regards the measurement of wavelength of emitted light from the exit slit 14, if the absorption band of the gas cell to be used is included in the wavelength region of the emitted light, as shown in FIG. 2 the gas cell 11 may be inserted into after the exit slit. By measuring changes in the light intensity through the optical sensor 23, the wavelength measurement can be done.

If the absorption band of the gas cell is not included in the wavelength region of emitted light, from the positions of plural absorption bands of the gas cell being present around it, the relationship between the angle θ of the spectroscopic means 8 and the wavelength of emitted light from the exit slit 14 may be detected while using means to be described below. Then, by controlling the angle theta Then, by controlling the angle θ of the spectroscopic means 8 in accordance with the detected relationship, emitted light having a desired wavelength can be obtained.

Regarding measurement of the relationship between the angle θ of the spectroscopic means 8 and the wavelength of light emitted from the exit slit 14, first the gas cell 11 is kept demounted and the intensity ratio (I/I0) is measured while scanning the angle θ with respect to the incident light of the spectroscopic means 8. As a result, a curve 31 such as shown in FIG. 3 is obtained.

Subsequently, the gas cell 11 is inserted, and a curve 32 including the absorption band of the gas cell is obtained.

Subsequently, in order to identify the angle θ at which the absorption band by the gas cell appears, the intensity ratio corresponding to different θs of the curve 32 is divided by the intensity ratio corresponding to different θs of the curve 31, whereby the transmittance 33 of light at different angles θs is obtained as shown in FIG. 4. Here, as shown at the curve 33, since the wavelength at which the transmittance becomes small (this being schematically illustrated at $\lambda 1$, $\lambda 2$ and $\lambda 3$ in the drawing) corresponds to the inherent absorption wavelength of the used gas cell, from the relationship of the curve 33 and as shown in FIG. 5, a θ-λ curve 34 that represents the relationship between the angle θ of the spectroscopic means 8 and the wavelength of the emitted light from the exit slit is obtainable.

On the basis of thus detected θ-λ curve 34, the spectroscopic means 8 can be set at an angloe θ corresponding to a desired emission light wavelength and, by doing so, emitted light of a desired wavelength can be provided.

As described hereinbefore, the wavelength of light to be emitted from a spectroscope such as shown in FIG. 2 is determined on the basis of the position and angle of a spectroscopic element such as diffraction grating or spectral crystal, and the position of light-flux restricting means such as pinhole or slit, for example. For this reason, spectroscopes have a very precise mechanism to precisely control the position or angle of them.

However, due to various factors such as a change in environmental temperature, a temperature change of an element caused by irradiation with light, a change in shape of a floor on which the spectroscope is placed, and expansion or contraction of a vacuum chamber resulting from a change in atmospheric pressure, the position or angle of the optical element or of the light-flux restricting means is variable, and this inevitably causes a change in wavelength of light to be emitted.

Therefore, even if the wavelength of emitted light is measured and calibrated by use of a gas cell as described hereinbefore, still there is a problem that the wavelength is variable in use. Furthermore, in that occasion, the θ-λ curve 34 itself shown in FIG. 5 changes, it needs very complicated operation to re-calibrate the wavelength having been changed with time. Consequently, it is practically very difficult to maintain the wavelength of emitted light from a spectroscope precisely at a desired wavelength.

Furthermore, as shown in FIG. 2, if the wavelength measurement is performed with respect to the light ray passed through an exit slit while using a gas cell, use of the spectroscope has to be interrupted each time the measurement is carried out. It is difficult to measure the wavelength of emitted light real time during the use of the spectroscope.

SUMMARY OF THE INVENTION

It is an object of the present invention to provide a spectroscope by which whether or not the wavelength of light emitted or to be emitted from an exit slit of the spectroscope is held exactly at a predetermined wavelength can be discriminated very precisely in a very short time.

In accordance with an aspect of the present invention, to achieve the above object, there is provided a spectroscope, comprising: a light source; a spectroscopic member for dispersing light from the light source in accordance with wavelength; a slit member arranged so that a portion of the dispersed light from said spectroscopic member can pass therethrough and a remaining portion of the light is blocked thereby; and a sensor having a spatial resolution capable of discriminating the wavelength of light passing through said slit member on the basis of a spectral distribution being projected in a spectral direction of light by said spectroscopic member.

In one preferred form of this aspect of the present invention, the spectroscope further comprises a driving mechanism for said spectroscopic member, wherein said driving mechanism is operable to drive said spectroscopic member thereby to change an advancement direction of light dispersed by said spectroscopic member, and wherein said spectroscope is arranged to drive said spectroscopic member through said driving mechanism on the basis of a spectral distribution obtained by said sensor, such that light of a desired wavelength can pass through said slit member. The advancement direction of light dispersed by the spectroscopic member can be changed thereby.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Preferred embodiments of the present invention will now be described with reference to the attached drawings.

Embodiment 1

Figure 1:
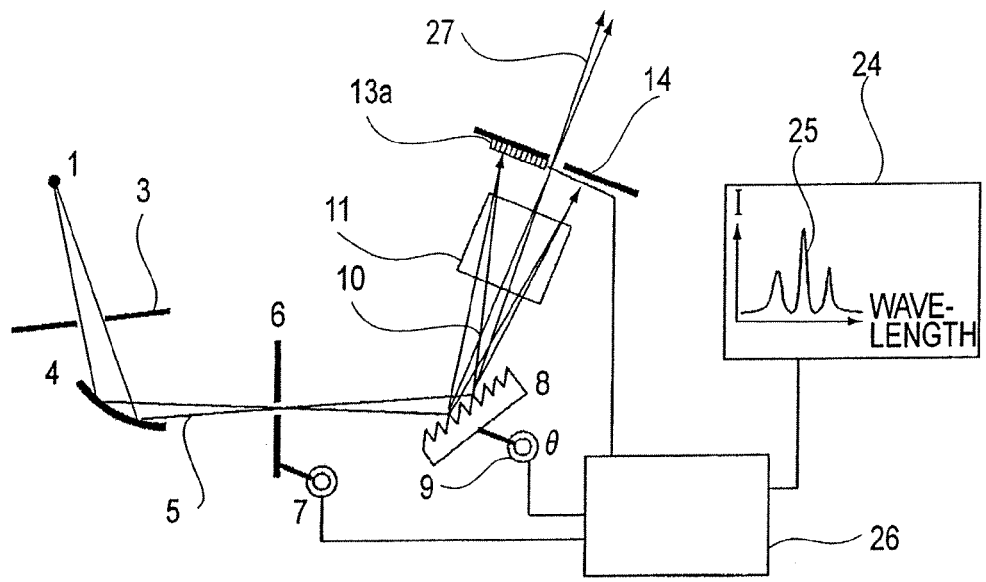
FIG. 1 is a schematic view of a spectroscope according to a first embodiment of the present invention.
Figure 2:
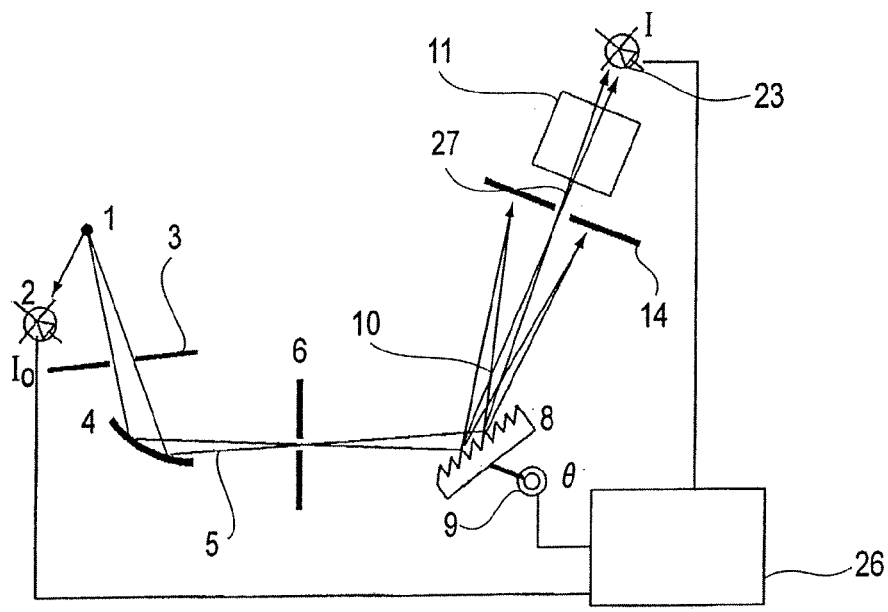
FIG. 2 is a schematic view for explaining a wavelength calibrating method in a conventional spectroscope.
Figure 3:
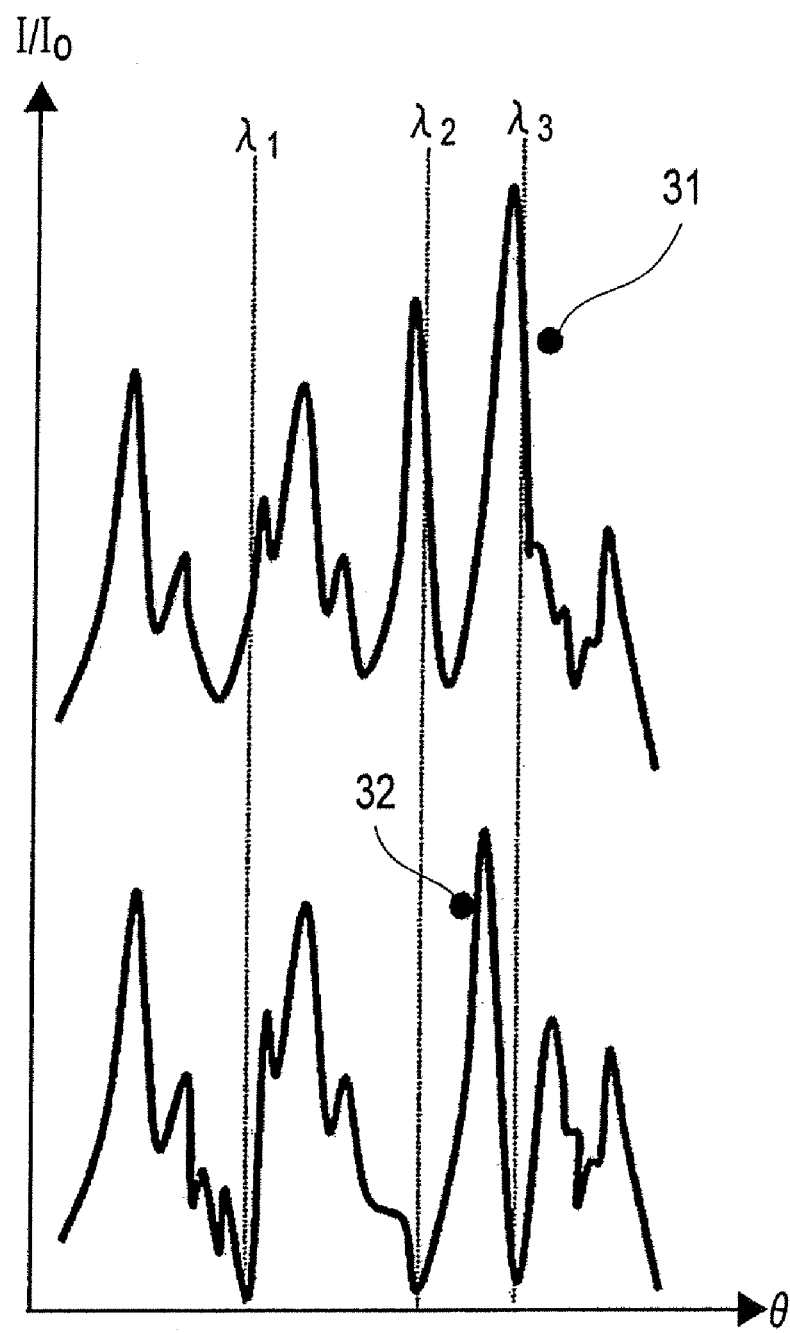
FIGS. 3, 4 and 5 are graphs, respectively, for explaining wavelength calibration in a conventional spectroscope.

FIG. 1 is a schematic view of a main portion of a spectroscope according to a first embodiment of the present invention. In FIG. 1, light emitted from light source means 1 passes through an entrance slit 3, and then it is collected by an optical element 4 such as a concave mirror or an aspherical surface mirror having a condensing function.

The light source means 1 may comprise a laser plasma light source, for example, wherein pulse-like laser light is focused and projected on a target material to produce high-temperature plasma, and soft X-rays or EUV light is produced thereby. From such light source means 1, a light flux with an inherent spectrum having a bright line at a particular wavelength is produced. In this embodiment, as an example of light source means 1, laser light is projected on a cooper foil by which a spectrum that includes light rays used for EUV light source is produced. Where a spectroscope such as shown in FIG. 1 is to be constituted by using an EUV light source, absorption of light rays by gas molecules is a problem to be considered. Thus, the light path should desirably be maintained in a vacuum.

As an important feature of this embodiment, to be described below, the wavelength selection is carried out on the basis of the spectrum of light from the light source. Thus, the light source to which the present invention is applicable is not limited to EUV light source. Any light source is usable as long as it produces a characteristic spectral light source.

Where a light source that produces soft X-rays or EUV light is used as the light source means 1 as described above, for obtaining a sufficient reflectance, the optical element 4 may comprise a multilayered mirror arranged to cause reflection on the basis of diffraction by a multilayered film. Depending on the multilayered mirror, among the light rays incident, only those light rays within a predetermined wavelength region are reflected toward a particular direction. As a result of this, based on the characteristics of the light source means 1 and the optical element 4, light 5 from the optical element 4 bears a certain inherent spectrum.

The light 5 is dispersed by a diffraction grating (spectroscopic means) 8 which is driven by a driving mechanism (actuator) 9 arranged to rotate the diffraction grating 8. Then, the light is incident an exit slit 14, whereby only light 27 having a particular wavelength can be emitted through its opening.

The diffraction grating 8 is mounted on a stage for setting the angle. The stage is provided with a driving mechanism 9 having a driving motor and a rotary encoder, for example, so that it can operate to set the angle of the diffraction grating 8 with respect to incident light and to measure that angle as well, simultaneously. The entrance slit 6 which is provided upstream (light entrance side) of the diffraction grating 8 and the exit slit 14 which is provided downstream (light exit side) of it, are disposed at such positions by which the angle defined by the light incident on the diffraction grating 8 and the light emitted therefrom, that is, the angle of deviation, becomes equal to a predetermined angle. By rotating the diffraction grating 8 to change the incidence angle of light to the diffraction grating 8 while keeping the deviation angle at the predetermined angle, light of different wavelength can be extracted from the opening of the exit slit 14.

Disposed on the light entrance side of the exit slit 14 is a one-dimensional or two-dimensional optical sensor 13a having a predetermined length in the spectral direction of light 10 from the diffraction grating 8 and having a predetermined resolving power (spatial resolution) as well. The optical sensor 13a may comprise an ordinary CCD element, for example. Among the light 10 dispersed by the diffraction grating 8, those light rays that do not pass through the exit slit 14 are projected on this sensor 13a. By measuring intensities at various positions on that optical sensor 13a, a portion of the spectral distribution of the light 10 as a whole is obtainable. From the standpoint of measurement precision, the end portion of the region in which picture elements that constitute the optical sensor 13a are distributed should desirably be disposed in registration with or close to the edge portion of the opening of the exit slit 14. By measuring the spectrum of the portion of the dispersed light 10 that does not pass through the exit slit 14 as described, the wavelength of light emitted through the exit slit can be detected. It should be noted that, regarding the spatial resolution of the optical sensor 13a, it is sufficient as long as the wavelength of light emitted from the exit slit 14 can be discriminated thereby.

In FIG. 1, preferably the diffraction grating 8 has a predetermined optical power as a whole. Once it is arranged so that an image of the light source means 1 is formed on the exit slit 14 (optical sensor 13a), the light rays included in the light 10 can provide a single spectrum upon the exit slit 14, such that a spectrum distribution of the light 10 is obtainable at the sensor 13a very precisely. The entrance slit 6 is disposed at a position being conjugate with the light source means with respect to the optical element 4, and it has a function for restricting the size of a practical light source as required.

In FIG. 1, although the optical sensor 13a is mounted only at one side of the exit slit 14, the sensor may be provided at both sides by which the range of measurement can be expanded.

Next, a method of precisely controlling the wavelength of light to be emitted from the exit slit 14; in a spectroscope having a structure such as shown in FIG. 1, will be explained.

First, a method of obtaining a reference spectrum, which is obtainable by dispersing the light 5 collected by the optical element 4, through the diffraction grating 8, will be described.

Figure 6:
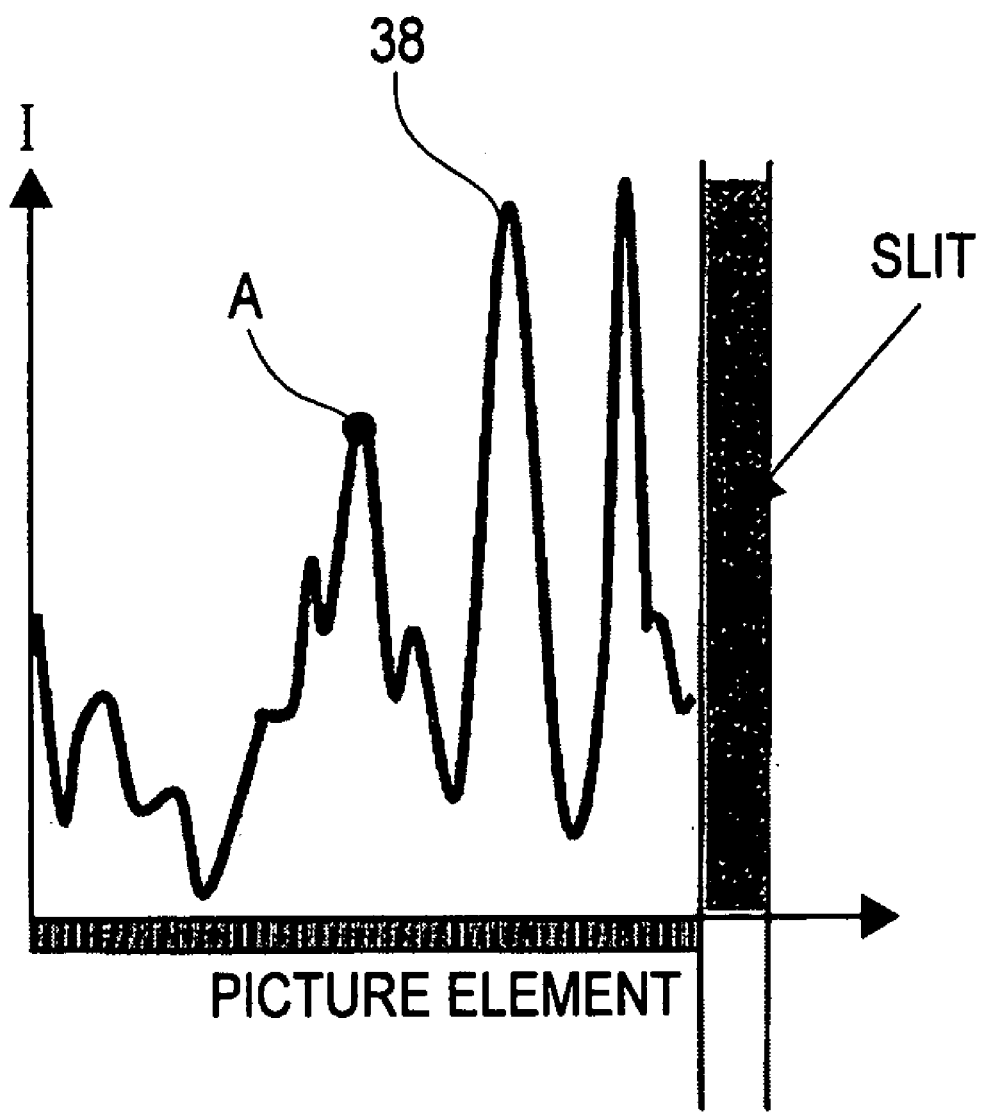
FIG. 6 is a graph of a spectral distribution (reference spectrum) without a gas cell.

In order to a reference spectrum, in FIG. 1 a gas cell 11 or the like is kept retracted out of the light path and, on the other hand, the angle θ of the diffraction grating 8 is set to a predetermined angle θ0 and the light source 1 is energized to emit light, and a spectral distribution is measured by using the optical sensor 13a. FIG. 6 illustrates a spectral distribution 38 as an example of the spectral distribution obtainable thereby. In FIG. 6, the spectral distribution is obtained within a region in which picture elements that constitute the sensor 13a are present. Since the edge of this region is in registration with the edge of the opening of the exit slit 14, the right-hand side of the spectral distribution of FIG. 6 corresponds to the opening of the exit slit 14.

The axis of abscissa of the spectral distribution 38 thus obtained corresponds to positions on the sensor 13a, in order to assure that the distribution can be used as a reference spectrum, correspondence of bright lines included in the spectral distribution 38 to respective wavelengths has to be determined and thus the axis of abscissa of the reference spectrum should be determined.

An example of such wavelength correspondence determination may be that, while taking into account the light source emission method (e.g. exited material) of the light source means 1 and the characteristic of the diffraction grating 8 or the like, if wavelengths of bright lines included in the reference spectrum are expected, the wavelength distribution corresponding to the axis of abscissa of the spectral distribution 38 in FIG. 6 can be determined on the basis of it.

In this embodiment, on the other hand, the wavelength distribution corresponding to the axis of abscissa of the spectral distribution 38 of FIG. 6 is determined on the basis of measurement using a gas cell. This will be explained below.

Figure 7:
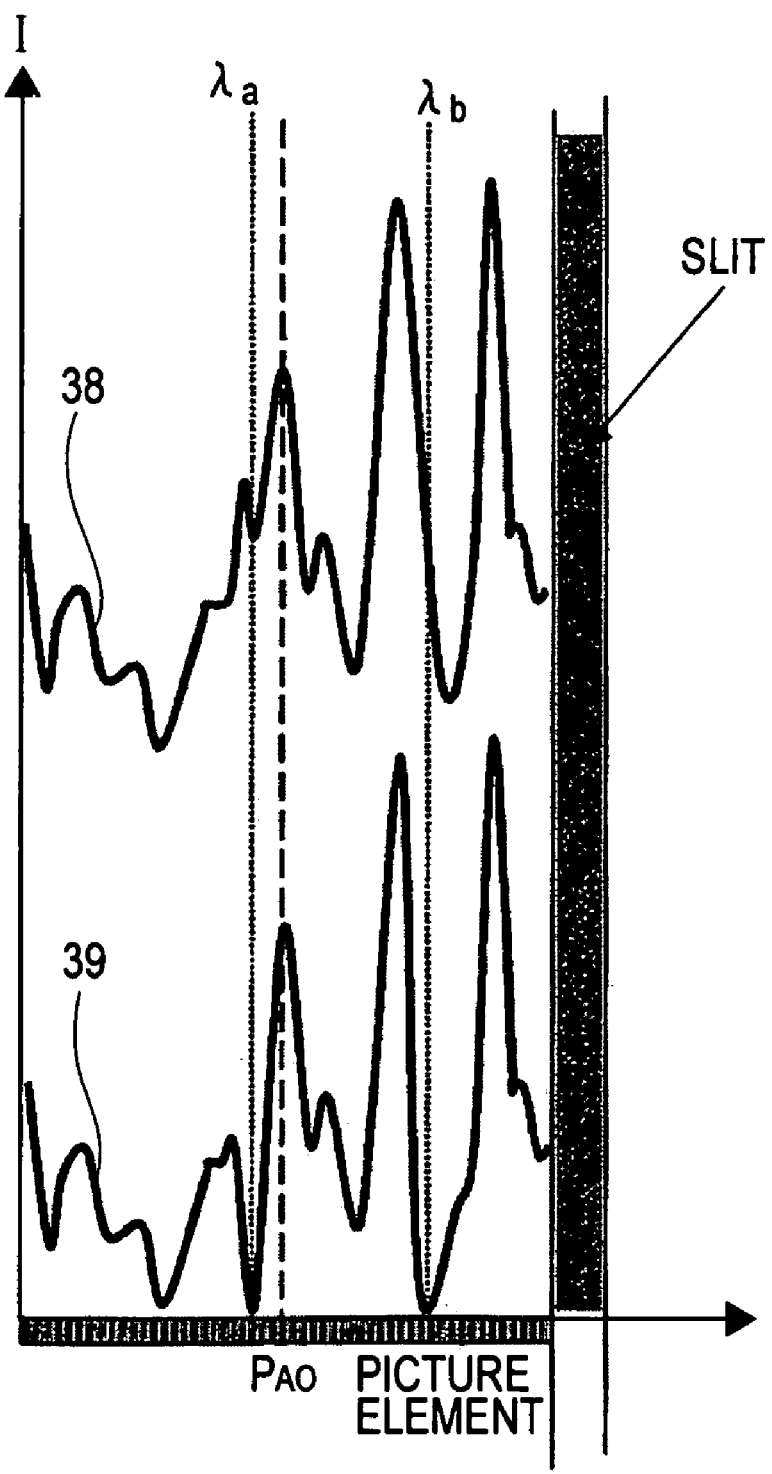
FIG. 7 is a graph illustrating changes in spectral distribution caused by insertion of a gas cell.
Figure 8:
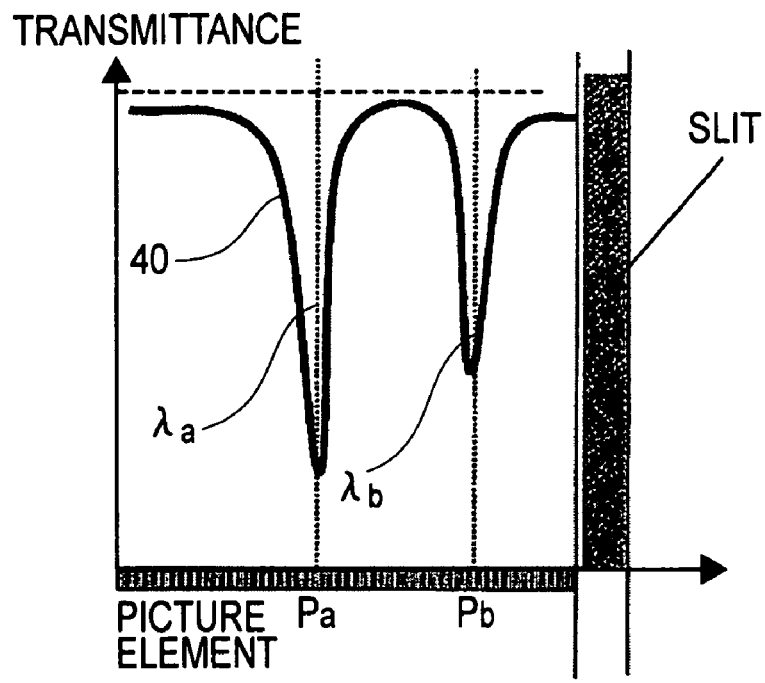
FIG. 8 is a graph of a transmittance curve.
Figure 9:
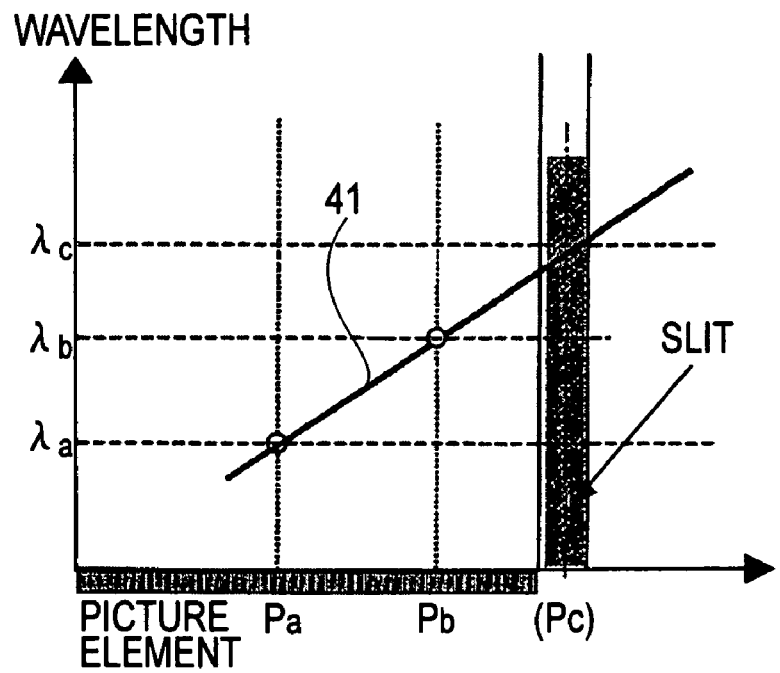
FIG. 9 is a graph illustrating the relationship between the wavelength and picture elements with which the spectral distribution is measured.

For measurement using a gas cell, a gas cell 11 that uses a krypton gas having a known absorption wavelength is inserted to between the diffraction grating and the sensor 13a and, regarding the remaining portion, the measurement is carried out essentially in the same manner as the measurement of the spectral distribution 38 itself described hereinbefore. Through this measurement, at the sensor 13a, as compared with the spectral distribution 38, a spectral distribution 39 in which light of a predetermined wavelength is selectively absorbed by the krypton gas within the gas cell is obtainable. FIG. 7 shows the thud obtained spectral distribution 39 in comparison with the spectral distribution 38. By dividing the spectral distribution 39 with the gas cell being inserted by the spectral distribution 38 having no gas cell inserted, an absorption curve of gas cell such as a curve 40 in FIG. 8 is obtainable. Thus, wavelengths such as at λa and λb being selectively absorbed by krypton gas are observed. On the basis of this, the relationship 41 between the position on the sensor 13a and the wavelength, as shown in FIG. 9, is detected. Hence, the wavelength that corresponds to the axis of abscissa of the obtained spectral distribution 38 can be determined, and thus a reference spectrum can be determined. The relationship between the position on the sensor 13a and the wavelength can be well approximated rectilinearly, within a certain wavelength region.

The relationship between the spectral distribution and the position of absorption by the gas cell, which appears in that distribution, is unchangeable in principle. Therefore, once the reference spectrum is determined in the manner described above, it is effective unless the spectral distribution itself is changed by changing the light source means 1 or the optical element 4, for example. Thus, the necessity of frequent calibration using the gas cell is removed.

The reference spectrum 25 having been interrelated with specific wavelength in the manner described above is then stored into memory means 24 of a controller 26. After this, by comparing the wavelength of a spectrum obtained whenever with the reference spectrum, the wavelengths that constitute the spectrum can be identified.

Next, a method of assuring emission of light of a desired wavelength from the exit slit 14 and of maintaining the wavelength of the light being emitted at a predetermined value, by use of the reference spectrum obtained as described above, will be explained.

Figure 10:
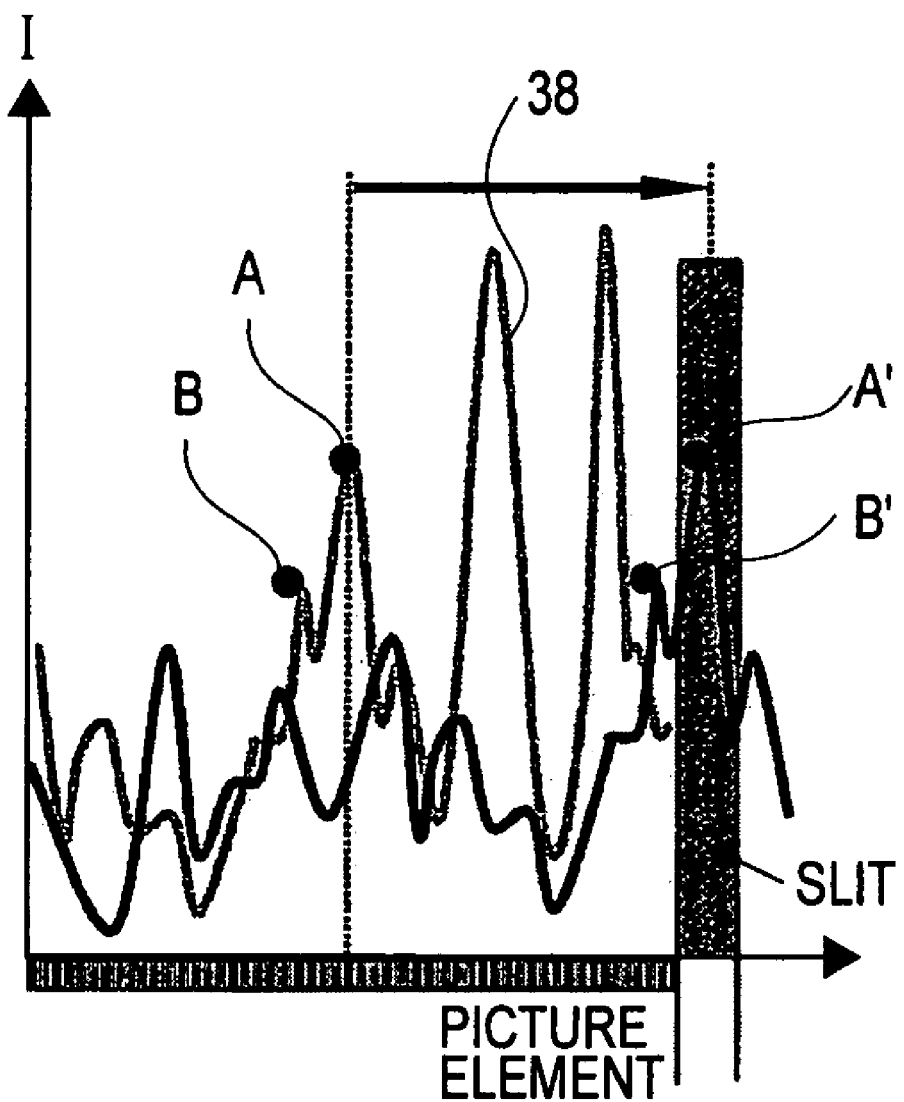
FIG. 10 is a graph schematically illustrating an example of wavelength region selection based on a reference spectrum.

FIG. 10 illustrates a convenient method for maintaining the wavelength band of light emitted from the exit slit 14 at a predetermined value, on the basis of the reference spectrum. In this method, a portion of the spectral distribution 38 that corresponds to a portion being found in the reference spectrum 25 and having a desired wavelength, is moved to the aperture portion of the exit slit 14 by rotating the diffraction grating 18. By doing so, it is assured that the light of the wanted wavelength is emitted through the exit slit 14. Furthermore, the position upon the sensor 13a of such spectrum portion that has another wavelength having an apparent relationship with the portion having the desired wavelength and that is going to be projected on the sensor 13a when the desired wavelength region is moved onto the aperture portion of the exit slit 14, is held at a predetermined position. This assures that the light emitted from the exit slit 14 has a desired wavelength and that such condition is held fixed.

As a specific example, in FIG. 10, a method of assuring emission of a desired wavelength region in a spectral distribution 38 which is analogous to the reference spectrum 25, through the exit slit 14, will be explained. As described hereinbefore, since the reference spectrum 25 is interrelated with corresponding wavelengths in terms of the axis of abscissa, by comparing the spectral distribution 38 with the shape of the reference spectrum, it is possible to specify the portion of the spectrum distribution 38 that corresponds to the desired wavelength. As a result of this, if for simplicity the portion denoted at A of the spectral distribution 38 is the portion that has a desired wavelength, while observing the spectrum projected on the sensor 13a the diffraction grating 8 is rotated by a required amount from the angle θ0 with which the reference spectrum 25 has been obtained, thereby to move the portion A toward the position corresponding to the aperture portion of the exit slit 14, as depicted by an arrow in FIG. 10. By doing so, light of a desired wavelength can be emitted through the aperture portion of the exit slit 14.

However, the portion denoted at A may not be projected upon the sensor 13a. Thus, it is not always assured that the portion A passes through the exit slit 14. In consideration of it, practically, a particular note is made to the position B in FIG. 10 adjacent the portion A, and B is shifted toward B' by such an amount by which A can be shifted to A'. Thus, by this, A shifts to A'. Furthermore, the angle of the diffraction grating 8 is held to avoid a change in the position of the B' upon the sensor 13a. By this and on the basis of real time observation during the use of the spectroscope, it is assured that light of a desired wavelength is emitted through the exit slit 14 regardless of a change in characteristics of various portions of the spectroscope.

Simultaneously with the operation described above, the aperture width of the exit slit 14 may be adjusted by using the driving means 15 for the exit slit 14, in the manner to be described later, by which the width of the wavelength region of light to be emitted from the exit slit 14 can be determined.

As regards the reference to be taken for moving the desired wavelength region to the exit slit 14, a characteristic portion of the spectrum such as described hereinbefore may be used or, alternatively, the shape of the spectrum as a whole may be taken as a reference. The operation may be made by an operator or, it may be carried out automatically in accordance with a known pattern matching method, for example. Further, for registration between the desired wavelength band and the exit slit 14 position, the aperture position itself of the exit slit 14 may be shifted.

The foregoing example has been explained with reference to a case wherein a portion of the reference spectrum is chosen to cause it to be emitted from the exit slit. However, by applying the relationship 41 between the wavelength and the position on the sensor 13a shown in FIG. 9 and by use of exploration, a wavelength not included in the reference spectrum (for example, λc in FIG. 9) can be emitted accurately.

Next, another method for calibrating the rotational angle of the diffraction grating 8 on the basis of the reference spectrum 25 obtained as described above and for assuring emission of light of a desired wavelength through the exit slit 3, will be explained. In this method, the reference spectrum is used to detect the difference between the spectrum being expected to be produced on the sensor 13a in accordance with the rotational angle of the diffraction grating 8 and the spectrum actually produced on the sensor 13a, and the rotational angle of the diffraction grating 8 is set appropriately while taking such difference into consideration, whereby emission of light of a desired wavelength through the exit slit 14 is assured. With the calibration of the rotational angle of the diffraction grating 8 using the reference spectrum as described above, it is ensured that a high precision is obtained even if, during actual measurement, the wavelength of emitted light is controlled only on the basis of the rotational angle of the diffraction grating 8 as conventional.

Figure 11:
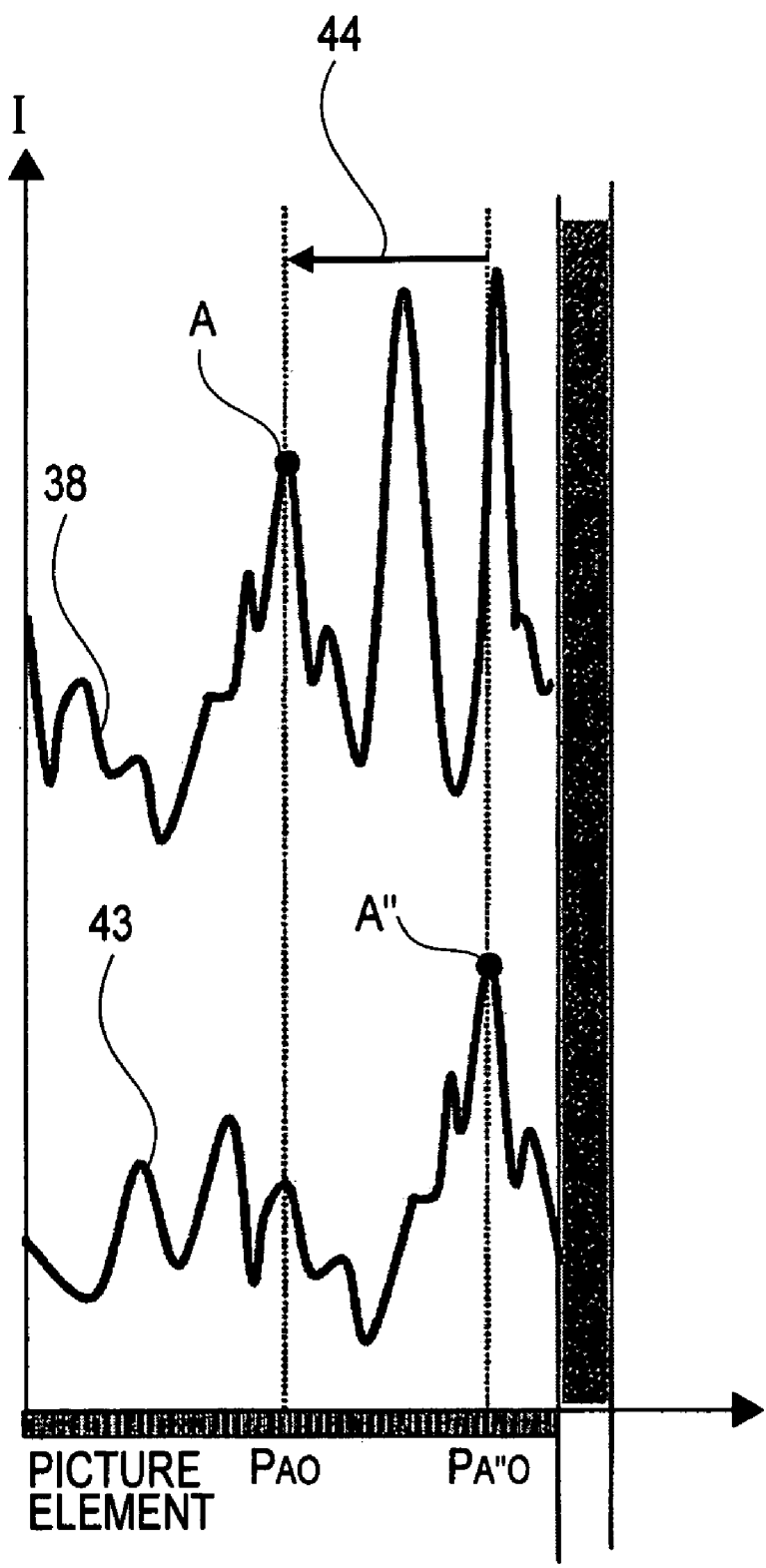
FIG. 11 is a graph schematically illustrating an example of angular calibration of a diffraction grating based on a reference spectrum.

The calibration for absorbing variation in characteristics of various portions of the spectroscope due to use of it and for determining interrelation between the rotational angle of the diffraction grating 8 and the wavelength of emitted light, may be carried out as follows. First, the angle θ of the diffraction grating 8 is set to θ0 which corresponds to the set angle of diffraction grating used for the reference spectrum measurement, and then the spectral distribution is measured by use of the sensor 13a. As shown in FIG. 11, the spectral distribution 43 which corresponds to the result of measurement and the reference spectrum 25 (spectral distribution 38) having been stored in the memory means 24 of the controller 26 are compared with each other. Then, calibration is made by shifting the rotational angle of the diffraction grating 8 by a displacement amount 44, for example, to bring A" which is a characteristic portion to the position that corresponds to inherent A. The subsequent measurement operation is carried out while taking the angle of the diffraction grating 8 at that time newly as θ0.

With the calibration method described above, even if there occurs a change in diffraction condition resulting from a change in characteristics of various portions of the spectroscope due to the use thereof, by calibrating the rotational angle of the diffraction grating 8 on the basis of comparison with the reference spectrum having been obtained beforehand, calibration can be done easily without use of a gas cell yet the wavelength of emitted light is controlled on the basis of the rotational angle of the diffraction grating 8.

Next, in relation to a spectroscope having a structure such as shown in FIG. 1, a method for increasing the resolution of a reference spectrum to be obtained or of a spectral distribution obtainable at the sensor 13a and for improving the wavelength selectivity to light to be emitted through the exit slit 14, will be explained.

As described hereinbefore, in FIG. 1 the entrance slit 6 is disposed at a position conjugate with the light source means with respect to the optical element 4, and it has a function for restricting the size of substantial light source as required. If the light source means 1 comprises a laser plasma light source as described above, the light source has a certain extension and it does not always provide a point light source. Thus, the incidence angle of light being incident on different positions on the diffraction grating is not even. In such occasion, even if the diffraction grating 8 is set at a predetermined angle with respect to the reference light ray of incident light, actually there are present lights being incident on the diffraction grating 8 at different angles. As a result of this, plural spectrums are projected superposedly upon the exit slit 14 (sensor 13a).

Figure 16A:
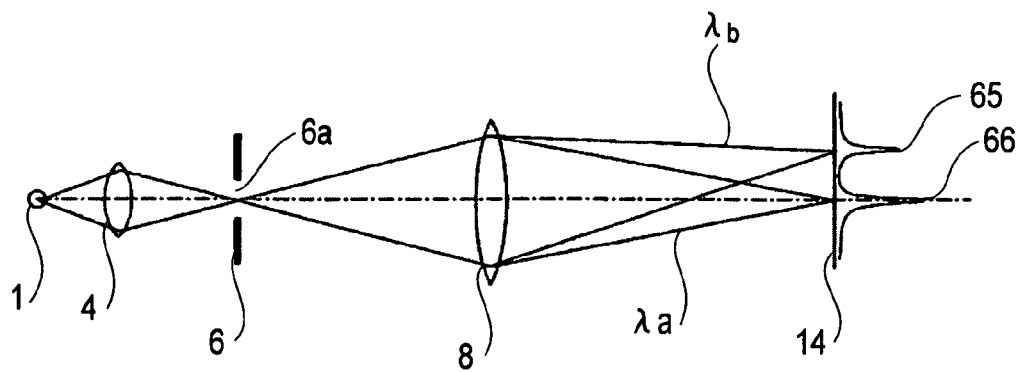
FIGS. 16A, 16B and 16C schematically illustrate the wavelength resolution adjusting function of an entrance slit.
Figure 16B:
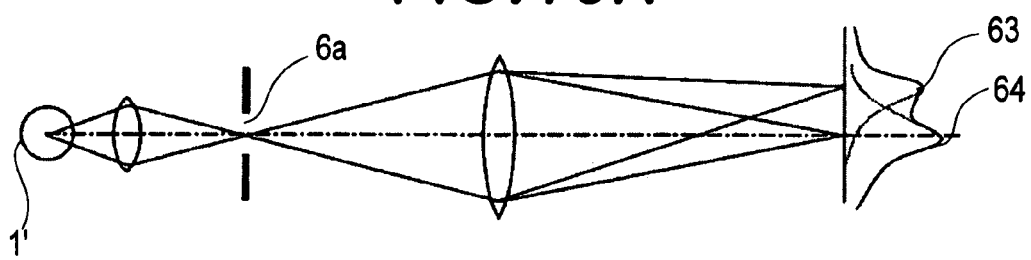
Figure 16C:
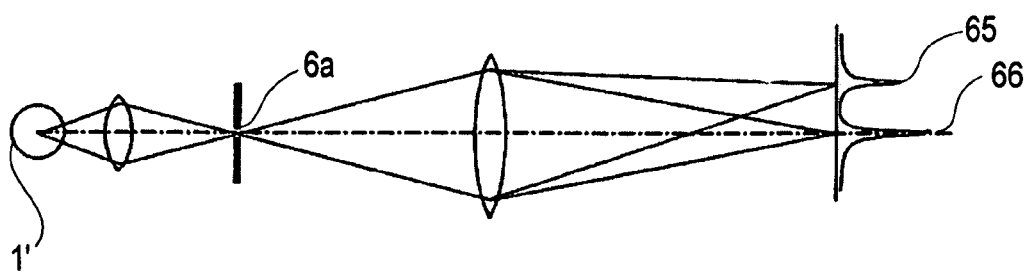

FIGS. 16A, 16B and 16C are schematic illustrations for explaining the size of a light source included in the light source means 1, the size of the opening of the entrance slit 6, and the resolution of a spectrum obtainable at the exit slit 14. In these drawings, the light path of the spectroscope shown in FIG. 1 is illustrated as being coaxial, for simplicity purpose. The signs in the drawings correspond to the signs in FIG. 1. Since it is desired that the diffraction grating 8 has an optical power for bringing the entrance slit 6 position and the exit slit 14 position in a conjugate relation, it is illustrated as being a convex lens, for easy understanding. Additionally, the dispersing function of the diffraction grating 8 is illustrated by drawing light rays of different wavelengths separately with respect to the vertical direction in the drawings.

FIG. 16A shows a case wherein the light source included in the light source means 1 can be well regarded as a point light source. In this case, since the light incident on the diffraction grating 8 can be regarded as having been emitted from a single point at the aperture of the entrance slit, the incidence angle at various positions on the diffraction grating 8 is even. Thus, upon the exit slit 14, the spectrum of the light source is directly projected, without changing the half band width of the bright line.

On the other hand, since a practical light source (1' in the drawing) has certain extension, if the opening of the entrance slit 6 is large (FIG. 16B), the light rays emitted from different positions inside the light source and being incident on the diffraction grating 8 are incident thereon at different angles. Thus, diffraction lights corresponding to them are projected on the exit slit 14, while their positions are shifted successively, each by a small amount. As a result of this, on the exit slit 14, these diffraction spectrums are projected in superposition, and thus the resolution is degraded.

As compared therewith, even if a light source having certain extension is used, by making the aperture of the entrance slit 6 sufficiently small (FIG. 16C), the light rays incident on the diffraction grating 8 can be regarded as having been emitted from a point light source. As a result, the spectral distribution produced on the exit slit 14 has a sufficient resolution.

Thus, as described above, by making the aperture of the entrance slit 6 small, it is assured that the spectral distribution formed on the exit slit 14 has sufficient resolution. In that case, however, the quantity of light that reaches the exit slit 14 decreases. Therefore, if light rays of desired wavelength should be produced as a practical spectroscope, the opening of the entrance slit 6 should be controlled to have a certain area.

Hence, in FIG. 1, the entrance slit 6 is provided with control means 7 for controlling the size of the opening of the slit. The control means 7 is connected to a controller 26, by which the opening of the entrance slit 6 is controlled. By using this control means 7 to increase the resolution of a spectrum distribution to be provided, provision of a reference spectrum, identification of the absorbing line based on a gas cell, angular calibration for the diffraction grating 8 and so on can be performed very precisely.

Embodiment 2

Figure 12:
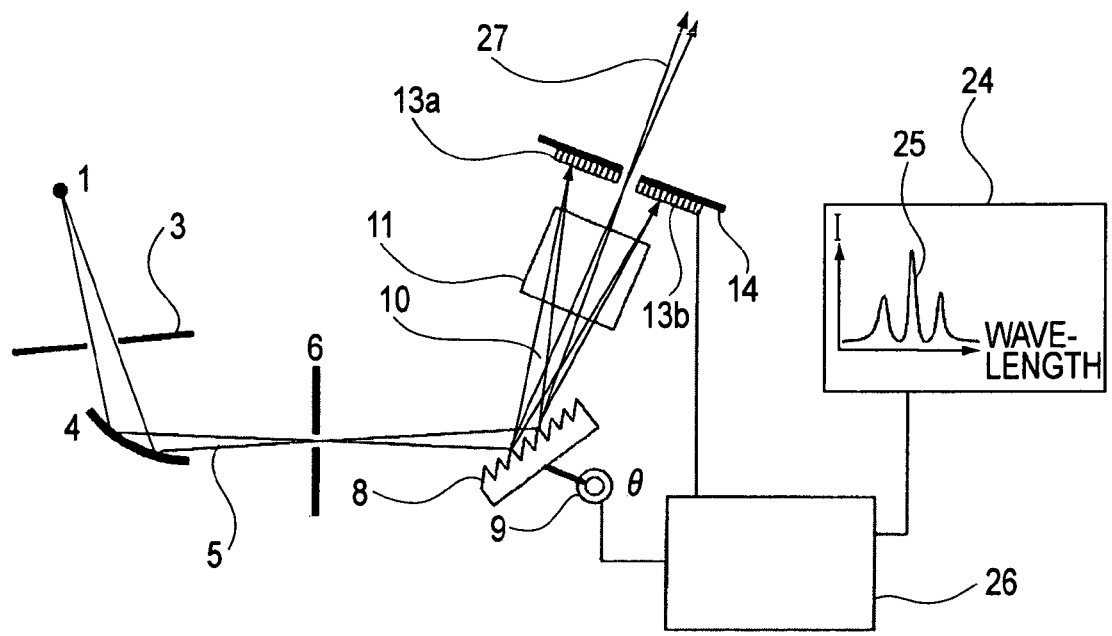
FIG. 12 is a schematic view of a spectroscope according to a second embodiment of the present invention.

FIG. 12 is a schematic view of a main portion of a measuring apparatus according to a second embodiment of the present invention. In FIG. 12, elements corresponding to those of FIG. 1 are denoted by like numerals. In this embodiment, as compared with the calibration having been described with reference to FIG. 1, a sensor 13b is added on the exit slit 14.

Figure 13:
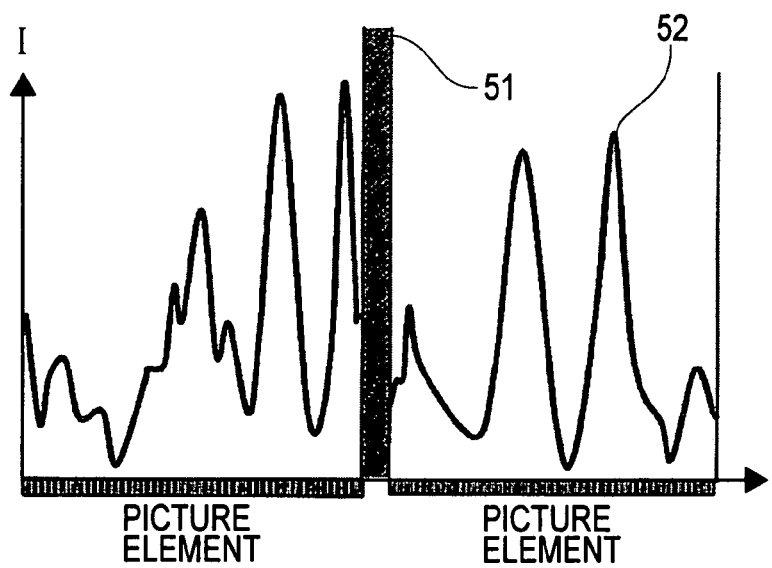
FIG. 13 is a graph of an example of spectrum, obtainable with the second embodiment.

FIG. 13 illustrates an example of reference spectrum obtainable by use of these sensors 13a and 13b. In the reference spectrum 52 in FIG. 13 as well, the wavelengths corresponding to various portions of the spectrum are interrelated in terms of the axis of abscissa in a similar manner as the first embodiment and, subsequently, the spectrum is stored into a memory device 24 of the controller 26. As shown in FIG. 12, the sensors 13a and 13b are provided at both sides of the position 51 that corresponds to the opening of the exit slit 14, and the spectral distribution formed on the both sides of the opening is measured. This enables calibration of the rotational angle of the diffraction grating 8 or control of the wavelength of emitted light with reference to a wider wavelength range.

Embodiment 3

Figure 14:
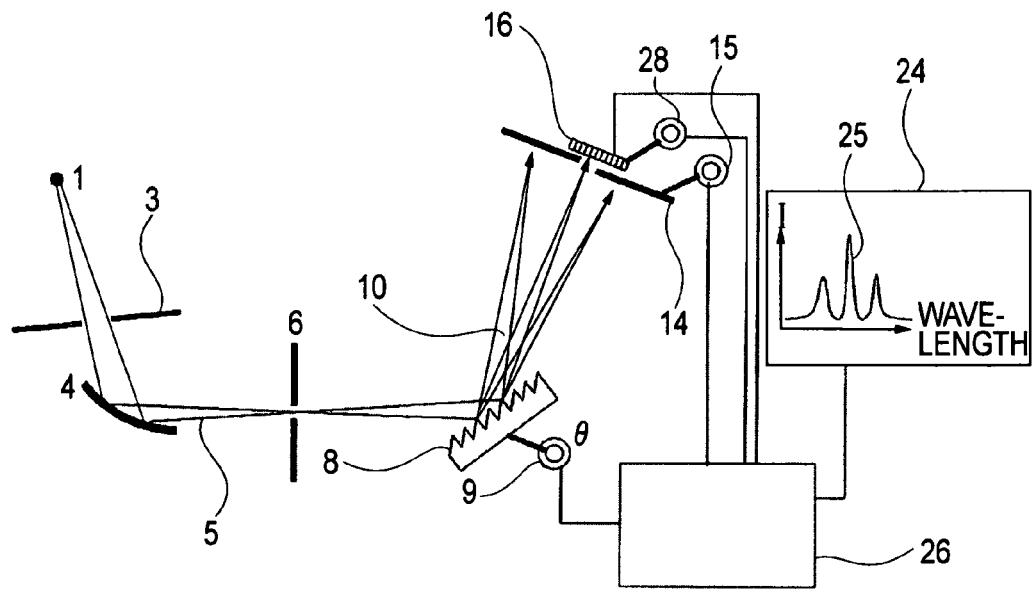
FIG. 14 is a schematic view of a spectroscope according to a third embodiment of the present invention.

FIG. 14 is a schematic view of a main portion of a measuring apparatus according to a third embodiment of the present invention. In FIG. 14, elements corresponding to those of FIG. 1 are denoted by like numerals. In FIG. 14, a one-dimensional or two-dimensional optical sensor 16 is provided after the exit slit 14. This sensor 16 comprises a picture element array having predetermined length and resolution with respect to the wavelength dispersion direction of light 10 by the diffraction grating 8. The sensor 16 is made demountably mountable onto the light path as required, by means of a mounting/demounting mechanism 28.

Like the sensor 13 having been described with reference to the preceding embodiments, the optical sensor 16 is used for getting a reference spectrum and for calibration of the rotational angle of the diffraction grating 8. Since in this embodiment the sensor 16 acquires a spectrum while it covers the opening of the exit slit 14, the wavelength of light to be emitted from the exit slit 14 can not be observed real time. However, with a relatively simple structure and through comparison of a spectrum shape or the like with the reference spectrum similar to the case of sensor 13, identification of the wavelength of light passed through the exit slit 14 as well as calibration of the rotation angle of the diffraction grating 8 can be done very easily without use of a gas cell or the like. The procedure for acquiring a reference spectrum and the procedure of calibration of rotational angle of the diffraction grating 8 are similar to those of the first embodiment.

The structure in which an optical sensor 16 is placed at the back of the exit slit 14 as shown in FIG. 14 is particularly effective if the opening portion of the exit slit 14 is relatively wide and plural bright lines are included in the slit transmitted light.

On the other hand, if the opening width of the exit slit 14 is small as compared with the width of bright lines within the spectrum, use of driving means 15 for adjusting the width and position of the opening of the exit slit 14 will be effective. Further, use of such driving means 15 will be effective also if the wavelength of emitted light desired in the spectroscope and the wavelength of bright lines to be used for calibration are relatively spaced apart.

Embodiment 4

Figure 15:
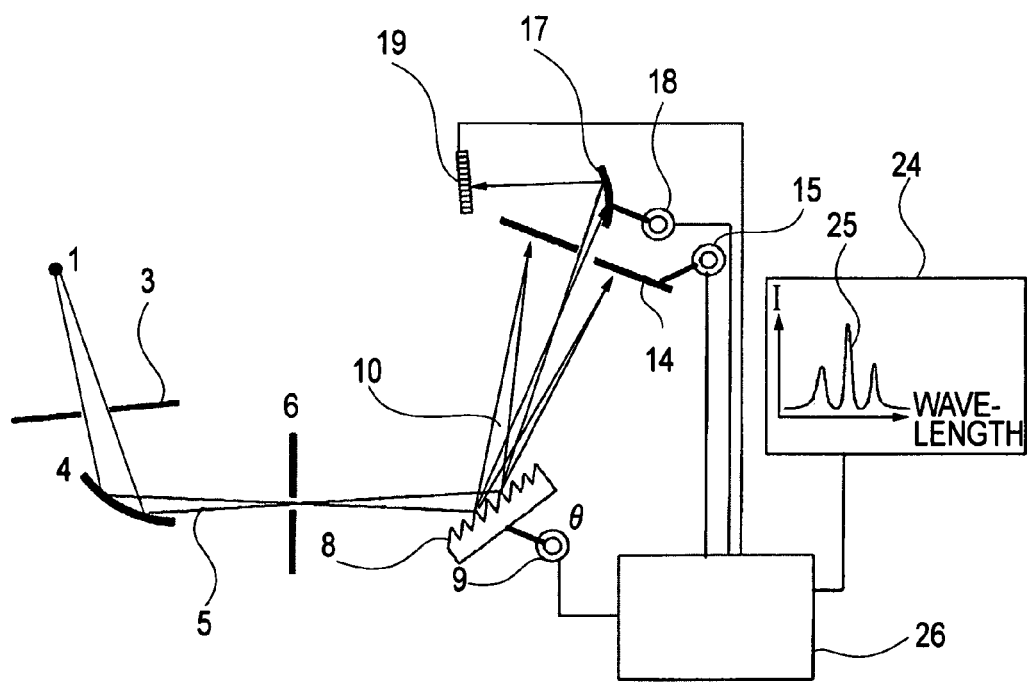
FIG. 15 is a schematic view of a spectroscope according to a fourth embodiment of the present invention.

FIG. 15 is a schematic view of a main portion of a measuring apparatus according to a fourth embodiment of the present invention. In FIG. 15, elements corresponding to those shown in FIGS. 1 and 14 are denoted by like numerals. FIG. 15 concerns a preferred embodiment when a spectroscope of the present invention is used as a reflectiometer.

In FIG. 15, a one-dimensional or two-dimensional optical sensor 19 is disposed at a position where reflection light from a reflection mirror 17, which is disposed after the exit slit 14, is incident. The optical sensor 19 has predetermined length and resolution with respect to the wavelength dispersion direction of light 10 by the diffraction grating 8. Denoted at 18 is driving means for holding the reflection mirror 17 and also for changing the set angle thereof.

For improvements of precision of the reference spectrum to be acquired, it is desired that the reflection mirror 17 functions to re-image the light source image, being imaged adjacent the exit slit 14, upon the optical sensor 19. If, however, the optical distance between the optical sensor 19 and the exit slit 14 is sufficiently small and also the opening angle of light passing through the exit slit 14 is sufficiently small such that the bright line spectrum can be identified, the imaging relationship by the mirror is not always necessary. Even if a plane mirror is used, the reference spectrum may be acquired at sufficient precision.

In a reflectiometer in which the reflectance is measured by use of light rays of particular wavelength, usually the light rays of the particular wavelength being emitted are projected on a reflection surface which is very the object of measurement, and the reflected light rays therefrom are incident on an optical intensity gauge to measure the intensity thereof. Thus, when a spectroscope of the present invention having a wavelength calibrating function based on a reference spectrum is applied to a reflectiometer, as shown in FIG. 15 an optical sensor 19 having predetermined length and resolution with respect to the wavelength dispersion direction of the measurement light may be used as an optical intensity gauge of the spectroscope. Also, in place of a mirror which is the object of reflectance measurement, a reflection mirror 17 may be disposed so as to re-image a light source image, being imaged adjacent the exit slit, upon the optical sensor 19. With this arrangement, substantially the same advantageous effects are attainable without using an additional sensor, having been described with reference to the first embodiment.

The procedure for acquiring a reference spectrum by use of the optical sensor 19 and the procedure of calibrating the angle of the diffraction grating 8 on the basis of the acquired reference spectrum, are similar to those of the first embodiment. In these procedures, for expanding the width of the spectral distribution to be provided, preferably the opening width of the exit slit 14 may be expanded by use of driving means 15.

Furthermore, if the mirror whose reflectance is going to be measured by the reflectiometer shown in FIG. 15 has a predetermined optical power, preferably the optical sensor 19 may be disposed at a position which is made conjugate with the exit slit 14 by the mirror that is very the object of measurement. With this arrangement, on the basis of comparison between the shape of a spectrum projected on the optical sensor 19 and the reference spectrum, measurement of the reflectance and the wavelength of the measurement light can be done simultaneously and real time.

Embodiment 5

Figure 17:
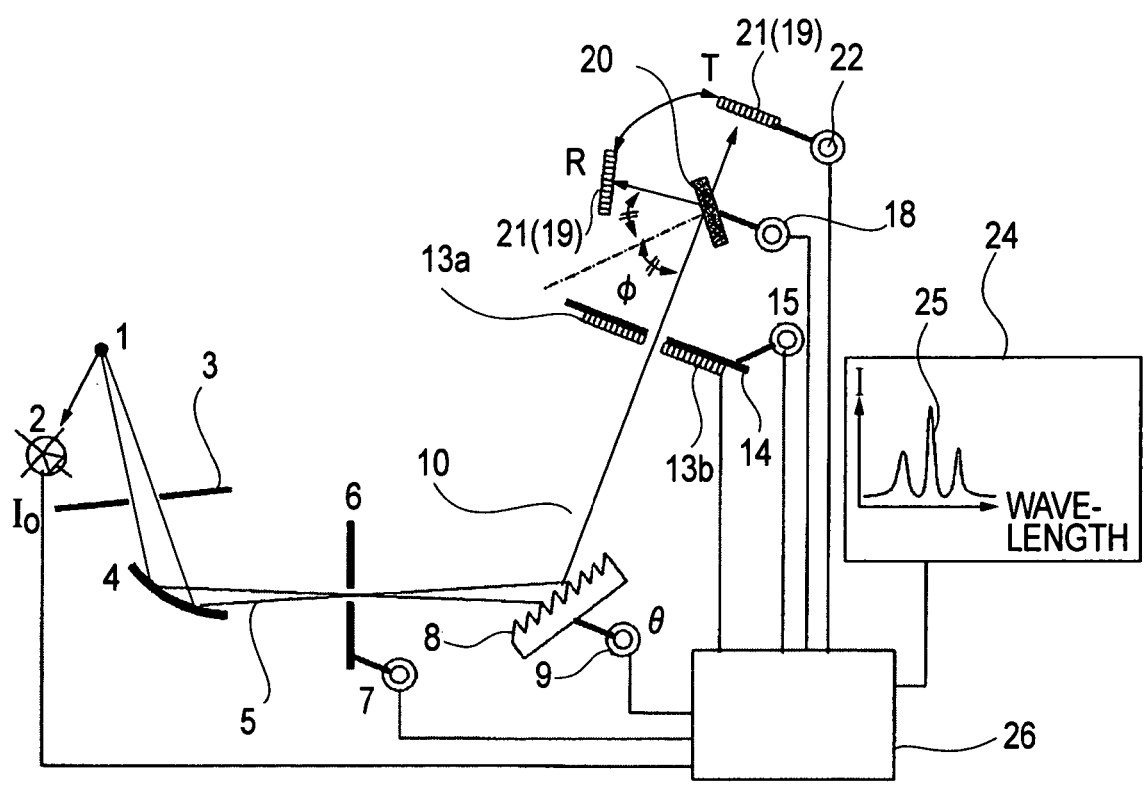
FIG. 17 is a schematic view of a spectroscope (reflectiometer) according to a fifth embodiment of the present invention.

FIG. 17 is a schematic view of a main portion of a measuring system for measuring the reflectance of an optical element (object of measurement) with respect to a particular wavelength, by use of a spectroscope as having been described above. The elements similar to those having been described in the preceding embodiments are denoted by like numerals.

In FIG. 17, denoted at 20 is an optical element (object of measurement) for which the reflectance should be measured. Denoted at 21 is an intensity sensor for measuring the magnitude of reflection light from the optical element 20. The sensor 21 is made movable between a position T for direct measurement of the intensity of incident light and a position R for measurement of the intensity of reflection light from the optical element. As has been described with reference to the fourth embodiment, an optical sensor 19 having a resolution in the dispersion direction of diffraction light 10 from the diffraction grating 8 may be used as this intensity sensor 21 and, by doing so, acquisition of a reference spectrum and calibration of the angle of the diffraction grating 8 can be done without the provision of any additional sensors. On the other hand, as has been described with reference to the first embodiment, when an optical sensor 13 is used and if the wavelength of light passing through the exit slit 14 is assured, such an optical sensor having no spatial resolution may be used as the intensity sensor 21.

As regards the of measuring the reflectance of the optical element 20 by use of a reflectiometer shown in FIG. 17, (a) a case wherein light of a predetermined wavelength can be emitted from the exit slit 14 in accordance with a method described in the first embodiment, and (b) a case wherein both of angular calibration of the diffraction grating 8 and the reflectance measurement are carried out by using an optical sensor 19 having a spatial resolution as the intensity sensor 21, as described in the fourth embodiment, will be explained below, respectively.

(a) A case wherein light of a predetermined wavelength can be emitted from the exit slit 14:

If real time observation of the wavelength of emitted light or angular calibration of the diffraction grating 8 is carried out in accordance with the method described in the first embodiment, by which it is assured that light of a predetermined wavelength is emitted through the exit slit 14, an optical sensor having no spatial resolution may be used as the intensity sensor 21 or, alternatively, a particular note may be made to a portion (or integrated intensity) of an optical sensor 19 having a spatial frequency, measurement of the reflectance of the optical element 20 can be performed.

Initially, a method of measuring the reflectance of the optical element 20 with respect to a particular wavelength ($\lambda$) will be explained. First, the optical element 20 is retracted by the driving means 18 out of the light path, and then the intensity sensor 21 is moved to the position T by the driving means 22. In this state, the light source means 1 is energized to cause light emission, and at that time, by using a light source intensity monitor 2 and the intensity sensor 21, the intensities of lights incident on these sensors, respectively, are measured.

Here, while taking $I0t(\lambda)$ as the output of the light source intensity monitor 2 and $Irt(\lambda)$ as the output of the intensity sensor 21, the ratio $Rt(\lambda)$ between them is calculated in accordance with equation (1) below. Then, the result is taken as the sensitivity of the intensity sensor 21 with respect to that wavelength.

$$Rt(\lambda)=Irt(\lambda)/I0t(\lambda) \quad (1)$$

Subsequently, the optical element 20 is inserted into the light path, and it is set by the driving means 18 so that the incidence angle with respect to the measuring light 10 becomes equal to a predetermined angle (ø). Similarly, the intensity sensor 21 is moved to the position R where the reflection light from the optical element 20 can be measured. In this state, the light source means 1 is energized again to cause light emission. The intensities of lights incident at that time on the light source intensity monitor 2 and the intensity sensor 21, respectively, are measured. Here, while taking $I0r(\lambda)$ as the output of the light source intensity monitor 2 and $Irr(\lambda)$ as the output of the intensity sensor 21, the ratio $Rr(\lambda)$ between them is calculated in accordance with equation (2) below. Then, the result is taken as the intensity of reflected light with respect to that wavelength.

$$Rr(\lambda)=Irr(\lambda)/I0r(\lambda) \quad (2)$$

Here, the reflectance $R(\lambda)$ of the optical element with respect to the wavelength $\lambda$ in question can be given by equation (3) below.

$$R(\lambda 3)=Rr(\lambda)/Rt(\lambda) \quad (3)$$

Figure 18:
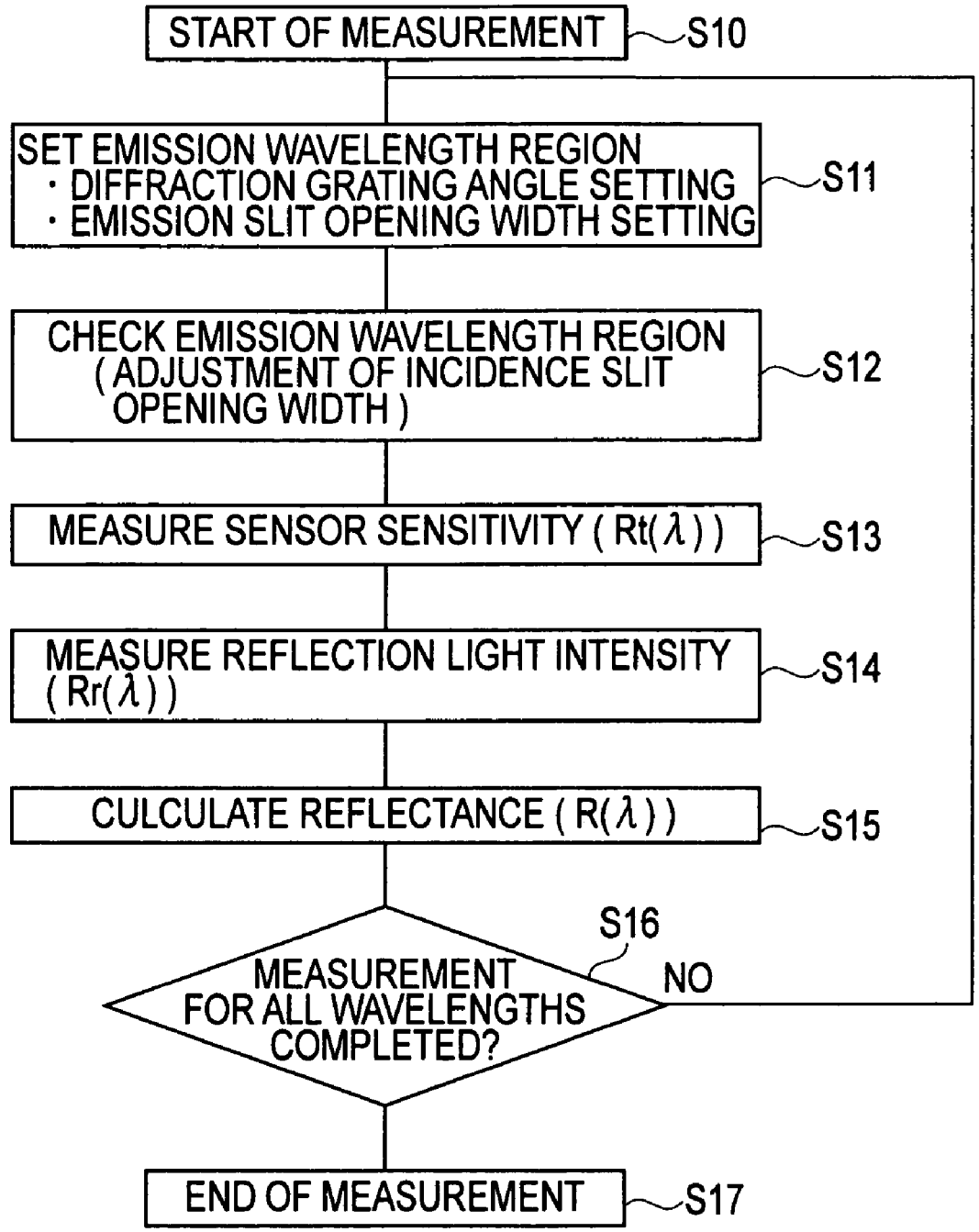
FIGS. 18 and 19 are flow charts, respectively, each for explaining procedure of reflectance measurement.

The reflectance measurement for the optical element 20 with respect to a particular wavelength is carried out in relation to each of plural wavelengths within a certain wavelength region. FIG. 18 is a flow chart including steps S10–S17, for the sequence of measuring the reflectance of the optical element 20 in accordance with the method described above.

In FIG. 18, initially, the angle of the diffraction grating 8 and the opening width of the exit slit 14 are determined to assure that light of a predetermined wavelength region to be used for the measurement is emitted through the exit slit 14. Namely, the center wavelength of the light to be used for the measurement is adjusted on the basis of the angle of the diffraction grating 8, while the width of the wavelength region is adjusted on the basis of the opening width of the exit slit 14.

Subsequently, as has been described with reference to the first embodiment, by making a comparison with the reference spectrum detected beforehand, the emitted wavelength region is checked. For this purpose, the spectrum being projected on the sensor 13 provided on the exit slit 14 and the reference spectrum are compared with each other, and whether a desired portion of the reference spectrum corresponds to the position on the exit slit is discriminated. Here, the opening width of the entrance slit 6 may be adjusted to adjust the resolution of the spectrum being projected. If the desired portion of the reference spectrum does not correspond to the position on the exit slit, the angle of the diffraction grating 8 and the opening width of the exit slit are adjusted again.

Subsequently, the sensitivity $Rt(\lambda)$ of the sensor 21 with respect to the wavelength $\lambda$ in question, the sensor being for measuring the intensity of reflection light reflected by the object of measurement, is measured. To this end, as described hereinbefore, the light from the exit slit 14 having the set wavelength is directly projected on the sensor 21, and an output ratio with the light source intensity monitor at that moment is detected.

Subsequently, reflection light being reflected by the object of measurement is projected on the sensor 21, and the intensity $Rr(\lambda)$ of the reflection light from the object of measurement with respect to the wavelength in question is measured. Also in this case, by detecting the intensity ratio with the light source intensity monitor 2, the reflectance can be detected precisely even if the emission light intensity of the light source is changed.

Subsequently, from the sensitivity $Rr(\lambda)$ of the sensor 21 and the intensity $Rt(\lambda)$ of the reflection light, the reflectance $R(\lambda)$ is calculated. The above-described measurement process is carried out with respect to all the predetermined wavelength region, and then the measurement is completed. By repeating the above-described measurement process with respect to all the required wavelength region, the measurement process is completed.

(b) A case wherein angular calibration of the diffraction grating 8 and the reflectance measurement are carried out by using an optical sensor 19 having a spatial resolution:

If an optical sensor 19 having a spatial resolution is used as the intensity sensor 21, a predetermined reflection mirror 17 may be used and, in that occasion, both of the angular calibration of the diffraction grating 8 and the reflectance measurement can be carried out without use of an additional sensor such as optical sensor 13.

Initially, a method of performing calibration of the angle of the diffraction grating 8 and calibration, if necessary, of the angle of driving means for the object of measurement, using the optical sensor 19, will be explained.

For calibration of these angles, a predetermined reflection mirror 17 such as described in the fourth embodiment is mounted on the driving means 18, to adjust the angle of the diffraction grating 8 and the angle of the driving means 18 by use of the optical sensor and in a similar manner as has been described with reference to the first embodiment, so that a spectrum similar to a reference spectrum obtained beforehand is projected upon the optical sensor 19.

Here, if the optical distance between the optical sensor 19 and the exit slit 14 is sufficiently small or the opening angle of light passing through the exit slit 14 is sufficiently small, the imaging relationship by the reflection mirror 17 is not always necessary. Even if a plane mirror is used, the angle of the diffraction grating 8 and the angle of the driving means 18 can be calibrated at sufficient precision.

Subsequently, for measurement of the reflectance of the optical element 20, the reflection mirror 17 is replaced by the optical element 20 which is the object of measurement. Also, the angle of the diffraction grating 8 having been calibrated is set to a predetermined angle, and light of a desired wavelength is emitted from the exit slit 14. In this state, the optical element 20 is retracted out of the light path by the driving means 18, while the optical sensor 19 is moved to the position T by the driving means 22. Then, the light source means 1 is energized to emit light. The intensities of lights incident on the light source intensity monitor 2 and the optical sensor 19 are measured, respectively, and then the sensitivity of the optical sensor 19 with respect to that wavelength is detected in a similar manner as described hereinbefore.

Subsequently, the optical element 20 is inserted into the light path and it is set by the driving means 18, having been calibrated as described above, so that the incidence angle with respect to the measuring light 10 becomes equal to a predetermined angle ø. Similarly, the optical sensor 19 is moved to the position R where reflection light from the optical element 20 can be measured. In this state, the light source means 1 is energized again to emit light. The intensities of lights incident on the light source monitor 2 and the optical sensor 19 are measured and, similarly as described, the result is taken as the intensity of the reflection light at the wavelength in question. Furthermore, from the sensitivity of the optical sensor 19 and the intensity of the reflection light, detected as described above, the reflectance of the optical element 20 is calculated.

In the measurement described above, since the spectrum of light passed through the exit slit 14 is not always projected on the optical sensor 19 satisfactorily, for determination of the sensitivity of the optical sensor 19 and the intensity of the reflection light described above, preferably the integrated intensity of the light projected on the whole surface of the optical sensor 19 may be used.

Figure 19:
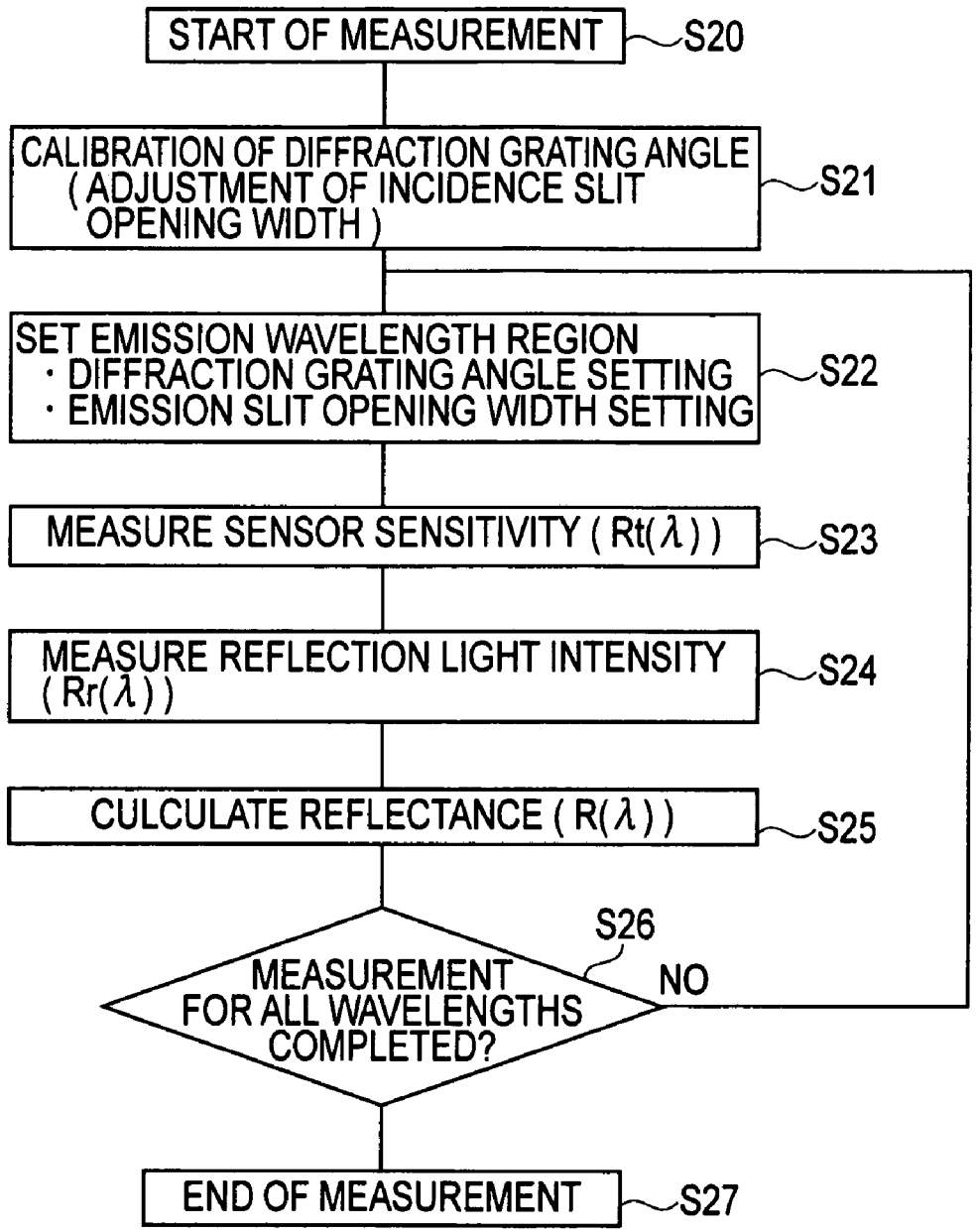

FIG. 19 illustrates the sequence (steps S20–S27) for the reflectance measuring method in a case wherein angular calibration of the diffraction grating 8 and the reflectance measurement are carried out by use of an optical sensor 19 having a spatial resolution, as described hereinbefore. It should be noted that, when the angle of the diffraction grating 8 is calibrated by use of the optical sensor 13 provided on the exit slit 14, the sequence of measurement operation will be similar to that shown in FIG. 19.

Initially, the angle of the diffraction grating 8 and the angle of the driving means 18 for the object of measurement, having a reflection mirror 17 mounted thereon, are adjusted to assure that a spectrum similar to the reference spectrum is projected on the sensor 19. Here, angular calibration is carried out by taking the angle of the diffraction grating at that time as a fresh reference, and the subsequent measurement is carried out on the basis of it.

For angular calibration of the diffraction grating 8, as has been described with reference to the first embodiment, the opening width of the entrance slit may be adjusted thereby to increase the resolution of the spectrum to be projected on the optical sensor 19, and the calibration may be done by using it.

Subsequently, the angle of the calibrated diffraction grating 8 and the opening width of the exit slit are set to predetermined values, respectively. Then, the sensor sensitivity is measured in a similar manner as described with reference to FIG. 18 and the reflection light from the object of measurement is measured, by which the reflectance is calculated. The above-described measurement procedure is carried out repeatedly with respect to all the required wavelength region, and the measurement process is completed.

Although this embodiment has been described with reference to an example wherein the spectroscope is used as a reflectiometer, in a similar procedure it may be used as a transmissometer. As a matter of course, the measurement procedure may be changed as required.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2004-016889 filed Jan. 26, 2004, for which is hereby incorporated by reference.

What is claimed is:

1. A spectroscope, comprising:
   a light source; a spectroscopic member for dispersing light from the light source in accordance with wavelength;
   a slit member arranged so that a portion of the dispersed light from said spectroscopic member can pass therethrough and a remaining portion of the light is blocked thereby; and
   a sensor having a spatial resolution capable of discriminating the wavelength of light passing through said slit member on the basis of a spectral distribution being projected in a spectral direction of light by said spectroscopic member,
   wherein said sensor is disposed at a light blocking portion of said slit member, wherein a spectral distribution of light other than the light passing through said slit member is obtainable with said sensor, and wherein said spectroscope is arranged to discriminate the wavelength of light passing through said slit member on the basis of the spectral distribution obtained with said sensor.

2. A spectroscope according to claim 1, further comprising a driving mechanism for said spectroscopic member, wherein said driving mechanism is operable to drive said spectroscopic member thereby to change an advancement direction of light dispersed by said spectroscopic member, and wherein said spectroscope is arranged to drive said spectroscopic member through said driving mechanism on the basis of a spectral distribution obtained by said sensor, such that light of a desired wavelength can pass through said slit member.

3. A spectroscope according to claim 1, further comprising a memory for storing therein a shape of at least a portion of a spectral distribution produced by the dispersion through said spectroscopic member, as a reference spectral distribution, wherein said spectroscope is arranged to perform comparison between the reference spectral distribution stored in said memory and the spectral distribution obtained at said sensor, to discriminate the wavelength of light emitted through said slit member on the basis of the spectral distribution obtained with said sensor.

4. A spectroscope according to claim 1, wherein said light source produces light that includes a predetermined bright-line spectrum.

5. A measuring apparatus, comprising: a spectroscope as recited in claim 1; and a measuring system for measuring at least one of reflectance and transmittance of a member to be measured, by use of light of a predetermined wavelength supplied by said spectroscope.

* * * * *

UNITED STATES PATENT AND TRADEMARK OFFICE
CERTIFICATE OF CORRECTION

PATENT NO. : 7,167,239 B2 Page 1 of 1
APPLICATION NO. : 11/042447
DATED : January 23, 2007
INVENTOR(S) : Yamamoto It is certified that error appears in the above-identified patent and that said Letters Patent is hereby corrected as shown below:

In the Drawings

Figure 4:
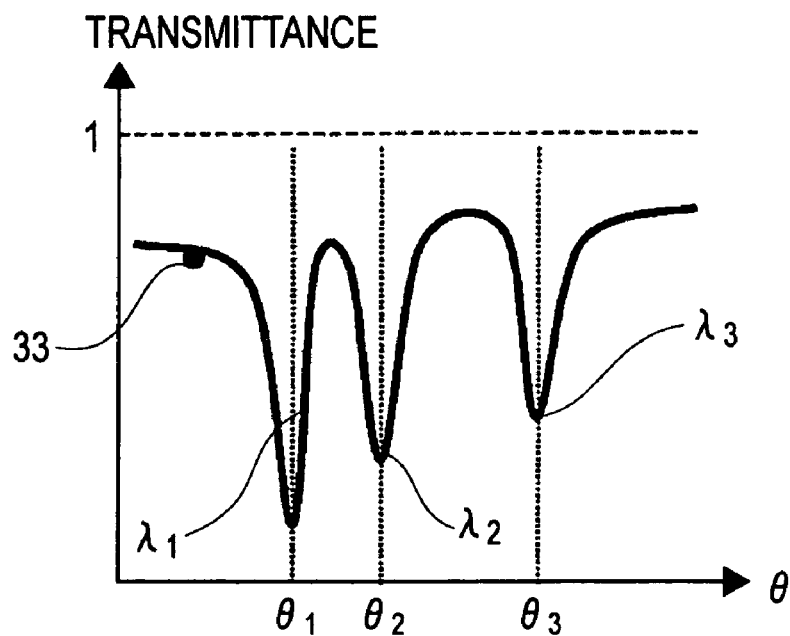

On sheet 3 of 4, below the legend "Fig. 4," please insert --Prior Art--.

Figure 5:
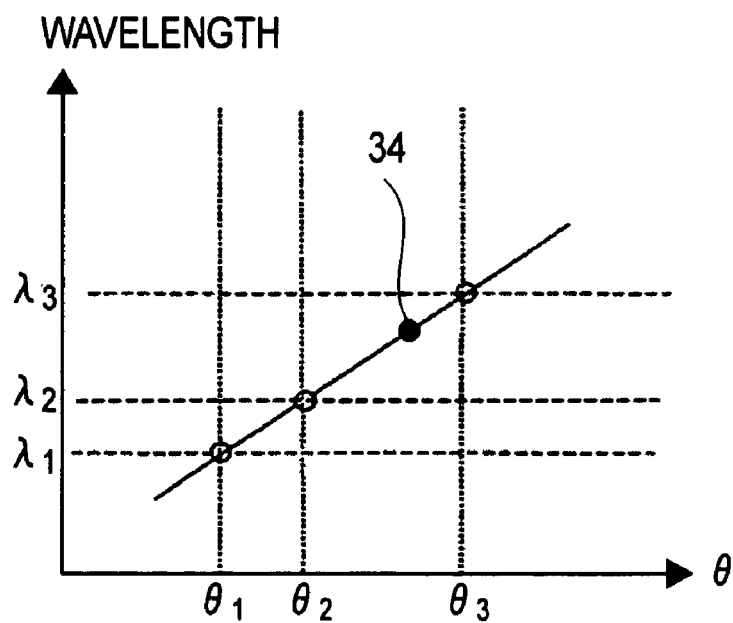

On sheet 3 of 4, below the legend "Fig. 5," please insert --Prior Art--.

Signed and Sealed this

Tenth Day of April, 2007

JON W. DUDAS
*Director of the United States Patent and Trademark Office*